United States Patent
Schneider (10) Patent No.: US 8,781,117 B2
(45) Date of Patent: Jul. 15, 2014

(54) GENERATING PSEUDO RANDOM BITS FROM POLYNOMIALS

(75) Inventor: James P. Schneider, Raleigh, NC (US)

(73) Assignee: Red Hat, Inc., Raleigh, NC (US)

(*) Notice: Subject to any disclaimer, the term of this patent is extended or adjusted under 35 U.S.C. 154(b) by 769 days.

(21) Appl. No.: 11/897,411

(22) Filed: Aug. 29, 2007

(65) Prior Publication Data

US 2009/0060179 A1    Mar. 5, 2009

(51) Int. Cl.
*H04L 29/06*    (2006.01)

(52) U.S. Cl.
USPC .............................................. 380/46

(58) Field of Classification Search
USPC .............................................. 380/46
See application file for complete search history.

(56) References Cited

U.S. PATENT DOCUMENTS

| | | | |
|---|---|---|---|
| 4,157,454 A | 6/1979 | Becker | |
| 5,003,597 A | 3/1991 | Merkle | |
| 5,214,703 A | 5/1993 | Massey et al. | |
| 5,361,323 A * | 11/1994 | Murata et al. | 704/201 |
| 5,619,576 A | 4/1997 | Shaw | |
| 5,724,428 A | 3/1998 | Rivest | |
| 5,799,088 A | 8/1998 | Raike | |
| 6,061,449 A | 5/2000 | Candelore et al. | |
| 6,122,379 A | 9/2000 | Barbir | |
| 6,247,112 B1 | 6/2001 | Seki | |
| 6,523,114 B1 * | 2/2003 | Barton | 713/176 |
| 6,560,338 B1 | 5/2003 | Rose et al. | |
| 6,999,588 B1 | 2/2006 | Oishi | |
| 7,103,181 B2 | 9/2006 | Ananth | |
| 7,263,540 B1 | 8/2007 | Kuehnel | |
| 7,328,228 B2 | 2/2008 | Klein et al. | |
| 7,795,899 B1 | 9/2010 | Grohoski et al. | |
| 7,925,009 B2 | 4/2011 | Schneider | |
| 7,945,049 B2 | 5/2011 | Schneider | |
| 7,962,540 B2 | 6/2011 | Michaels et al. | |
| 8,265,272 B2 | 9/2012 | Schneider | |
| 8,358,781 B2 | 1/2013 | Schneider | |
| 8,416,947 B2 | 4/2013 | Schneider | |
| 8,560,587 B2 | 10/2013 | Schneider | |
| 8,588,412 B2 | 11/2013 | Schneider | |
| 2001/0029608 A1 | 10/2001 | Nagashima et al. | |
| 2001/0033656 A1 | 10/2001 | Gligor et al. | |
| 2002/0054679 A1 | 5/2002 | Vesely | |
| 2002/0124033 A1 | 9/2002 | Takahashi | |
| 2002/0136406 A1 | 9/2002 | Fitzhardinge et al. | |
| 2003/0048728 A1 | 3/2003 | Kuribayashi et al. | |
| 2003/0048899 A1 | 3/2003 | Spacey | |
| 2003/0059040 A1 | 3/2003 | Rose et al. | |
| 2003/0217268 A1 * | 11/2003 | Gantman | 713/172 |
| 2004/0120518 A1 | 6/2004 | Macy et al. | |

(Continued)

OTHER PUBLICATIONS

Wolfram Math World "Primitive Polynomials", http://mathworld.wolfram.com/primitivepolynomial.html, pp. 1-2, Feb. 9, 2006 from Internet Archive WayBack Machine.*

(Continued)

*Primary Examiner* — Lisa Lewis
(74) *Attorney, Agent, or Firm* — Lowenstein Sandler LLP (57) ABSTRACT

Some embodiments of a method and an apparatus to generate pseudo random bits from polynomials have been presented. In one embodiment, a set of finite field polynomials is used to generate a series of pseudo random bits in one or more cycles. Then a cryptographic key is generated from the series of pseudo random bits.

19 Claims, 5 Drawing Sheets

(56) References Cited

U.S. PATENT DOCUMENTS

| | | |
|---|---|---|
| 2004/0215686 A1 | 10/2004 | Yoon et al. |
| 2005/0065955 A1 | 3/2005 | Babikov et al. |
| 2005/0097153 A1 | 5/2005 | Dirscherl et al. |
| 2005/0131961 A1 | 6/2005 | Margolus et al. |
| 2005/0177727 A1 | 8/2005 | Moskowitz et al. |
| 2005/0246215 A1 | 11/2005 | Rackham |
| 2006/0126843 A1 | 6/2006 | Brickell et al. |
| 2006/0129419 A1 | 6/2006 | Flaxer et al. |
| 2006/0156187 A1 | 7/2006 | Wu et al. |
| 2007/0076890 A1 | 4/2007 | Muresan et al. |
| 2007/0237327 A1 | 10/2007 | Taylor et al. |
| 2008/0069342 A1 | 3/2008 | Relyea |
| 2008/0109501 A1* | 5/2008 | Douguet et al. .............. 708/250 |
| 2008/0130876 A1 | 6/2008 | Etienne et al. |
| 2008/0292096 A1 | 11/2008 | Schneider |
| 2008/0298583 A1 | 12/2008 | Ahmed |
| 2008/0307024 A1 | 12/2008 | Michaels et al. |
| 2009/0060179 A1 | 3/2009 | Schneider |
| 2009/0060180 A1 | 3/2009 | Schneider |
| 2009/0195370 A1 | 8/2009 | Huffman et al. |
| 2009/0214024 A1 | 8/2009 | Schneider |
| 2009/0220083 A1 | 9/2009 | Schneider |
| 2009/0279690 A1 | 11/2009 | Michaels et al. |
| 2009/0292752 A1 | 11/2009 | Schneider |
| 2010/0135486 A1 | 6/2010 | Schneider |

OTHER PUBLICATIONS

Tan. "The PLFG parallel pseudorandom No. generator" Feb. 2002 pp. 693-698. Future generation computer systems vol. 18 issue 5.*
"Blum Blum Shub Generator" from https://www.cs.indiana.edu/~kapadia/project2/node11.html, 1 page, May 30, 2001.*
Secure Cryptoprocessor, from Wikipedia, the free encyclopedia. http//en.wikipedia.org/wiki/Secure_cryptoprocessor. Aug. 10, 2007. 3 pages.
Blum Blum Shub from Wikipedia, the free encyclopedia. http//en.wikipedia.org/wiki/Blum_Blum_Shub. Aug. 9, 2007. 2 pages.
Finite Field from Wikipedia, the free encyclopedia. http//en.wikipedia.org/wiki/Galois_field. Aug. 10, 2007. 5 pages.
Applied Cryptography, 2nd Edition, Chapter 17, pp. 417-418.
Barker, William C., "Recommendation for the Triple Data Encryption Algorithm (TDEA) Block Cipher", National Institute of Standards and Technology, Technology Administration U.S. Department of Commerce, Information Security, NIST Special Publication 800-67, Version 1.1, Revised May 19, 2008 (May 2004), 40 pages.
Bauer, Friedrich L., "8. Transposition Ciphers", Decrypted Secrets, 2nd edition, (2000), 16 pages.
Belal, Ahmed A., et al., "2D-Encryption Mode" Mar. 2001, 32 pages.
Bellare, M., et al., "A Conventional Authenticated-Encryption Mode" Submission to National Institute of Standards and Technology, Apr. 13, 2003, 14 pages.
Bellare, M., et al., "The FFX Mode of Operation for Format-Preserving Encryption" Feb. 20, 2010, 18 pages.
Black, John, et al., "A Suggestion for handling Arbitrary-Length Messages with the CBC MAC", Aug. 2001, 3 pages.
Brier, Eric, et al., "BPS: a Format-Preserving Encryption Proposal" 11 pages, Ingenico, France. Published at the following website Apr. 2010, http://csrc.nist.gov/groups/ST/toolkit/BCM/modes development.html.
Cohen, Bram, "AES-hash" May 2, 2001, 4 pages.
"Data Encryption Standard (DES)", FIPS Pub 46-2, Dec. 30, 1993, 16 pages, http://www.itl.nist.gov/fipspubs/fip46-2.htm.
"Data Encryption Standard (DES)", U.S. Department of Commerce/National Institute of Standards and Technology, FIPS Pub 46-3, Reaffirmed Oct. 25, 1999, (Oct. 25, 1999), 26 pages.
Dworkin, Morris, "Recommendation for Block Cipher Modes of Operation—Galois/Counter Mode (GCM) and GMAC" National Institute of Standards and Technology, Technology Administration U.S. Department of Commerce, Information Security, NIST Special Publication 800-38D, Nov. 2007, 39 pages.
Dworkin, Morris, "Recommendation for Block Cipher Modes of Operation—Methods and Techniques" National Institute of Standards and Technology, Technology Administration U.S. Department of Commerce, Information Security, NIST Special Publication 800-38A, 2001, 66 pages.
Dworkin, Morris, "Recommendation for Block Cipher Modes of Operation—The CCM Mode for Authentication and Confidentiality" National Institute of Standards and Technology, Technology Administration U.S. Department of Commerce, Information Security, NIST Special Publication 800-38C, May 2004, updated 2007, 27 pages.
Dworkin, Morris, "Recommendation for Block Cipher Modes of Operation—the CMAC Mode for Authentication" National Institute of Standards and Technology, Technology Administration U.S. Department of Commerce, Information Security, NIST Special Publication 800-38B, May 2005, 25 pages.
Dworkin, Morris, "Recommendation for Block Cipher Modes of Operation—the XTS-AES Mode for Confidentiality on Storage Devices" National Institute of Standards and Technology, Technology Administration U.S. Department of Commerce, Information Security, NIST Special Publication 800-38E, Jan. 2010, 12 pages.
Fischer, Viktor, "Realization of the Round 2 AES Candidates Using Altera FPGA", (2000), pp. 1-15.
Gligor, Virgil D., et al., "Fast Encryption and Authentication: XCBC Encryption and EXCB Authentication Modes" Mar. 30, 2001 (Apr. 20, 2001, revision), 64 pages, retrieved from http://csrc.nist.gov/groups/ST/toolkit/BCM/modes_development.html.
Gligor, Virgil D., et al., "On Message Integrity in Symmetric Encryption" Nov. 10, 2000, 41 pages. VDG Inc., Maryland.
Håstad, Johan, et al., "Key Feedback Mode: a Keystream Generator with Provable Security" Oct. 11, 2000, 23 pages, Stockholm, Sweden.
Hellstrom, Henrick, "Propagating Cipher Feedback mode" 2001, 4 pages.
Housely, Russ, et al., "Counter with CBC-MAC (CCM)—AES Mode of Operation" RSA Laboratories, Submission to National Institute of Standards and Technology, Jun. 3, 2002, 9 pages.
Iwata, Tetsu, et al., "OMAC: One-Key CBC MAC" Dec. 20, 2002, 32 pages.
Jaulmes, Antoine Joux, et al., "On the Security of Randomized CBC-MAC Beyond the Birthday Paradox Limit A New Construction" 2002, 15 pages, DCSSI Crypto Lab.
Jutla, Charanjit S., "Encryption Modes with Almost Free Message Integrity" IBM T.J. Watson Research Center, New York, 2001, 6 pages.
Jutla, Charanjit S., "Parallelizable Encryption Mode with Almost Free Message Integrity" IBM T.J. Watson Research Center, 2000, 23 pages.
Knudsen, Lars R., "Reports in Informatics—Block Chaining modes of operation" Oct. 2000, 16 pages, Report No. 207, Department of Informatics, University of Bergen, Bergen, Norway.
Kohno, Tadayoshi, et al., "The CWC Authenticated Encryption (Associated Data) Mode" May 27, 2003, 18 pages, Submission to National Institute of Standards and Technology.
Kurosawa, Kaoru, et al., "TMAC: Two-Key CBC MAC" Jun. 21, 2002, 18 pages.
Lipmaa, Helger, et al., "Comments to NIST concerning AES Modes of Operations:" CTR-Mode Encryption 2000, 4 pages.
Mattsson, Ulf T., "Format-Controlling Encryption using Datatype-Preserving Encryption" Jun. 30, 2009, 46 pages, Protegrity Corporation.
McGrew, David A., et al., The Galois/Counter Mode of Operation (GCM) Submission to National Institute of Standards and Technology, May 31, 2005, 44 pages.
Mirza, Fauzan, "Block Ciphers and Cryptanalysis" Mar. 1998, pp. 1-27.
Rogaway, Phillip, "PMAC—Proposal to NIST for a parallelizable message authentication code" Apr. 1, 2001, 27 pages.
Rogaway, Phillip, et al., "OCB: A Block-Cipher mode of operation for Efficient Authenticated Encryption" Aug. 3, 2001, 36 pages.
Rogaway, Phillip, et al., "The SIV Mode of Operation for Deterministic Authenticated-Encryption (Key Wrap) and Misuse-Resistant (56) References Cited

OTHER PUBLICATIONS

Nonce-Based Authenticated-Encryption" Aug. 20, 2007, 3 pages, retrieved from http://csrc.nist.gov/groups/ST/toolkit/BCM/modes_development.html.
Rose, Greg, "A Stream Cipher Based on Linear Feedback over GF(28)", Springer-Verlag Berlin Heidelberg, C. Boyd and E. Dawson: ACISP '98, LNCSI1438, (1998), pp. 135-145.
Rsa, "What is Cipher Block Chaining Mode?" Mar. 3, 2007 from Internet Archive WayBack machine. http://web.archive.org/web/20070303121357/http://www.rsa.com/rsalabs/node.asp?id=2171.
Schroeppel, Richard C., et al., "Cipher-State (CS) Mode of Operation for AES" Sandia National Laboratories, Submission to National Institute of Standards and Technology, May 7, 2004, 8 pages.
Schneier, "Applied Cryptography", John Wiley and Sons, 2nd Edition, (1996), p. 319.
Shannon, C.E., "Communication Theory of Secrecy Systems" Bell System Techinical Journal, vol. 28, (4) 1949, pp. 656-715.
Tan, Chih Jeng K., "The PLFG parallel pseudorandom sumber generator", Future Generation computer Systems vol. 18, Issue 5, (Feb. 2002), pp. 693-698.
"Transposition cipher", Wikipedia, the free encyclopedia, http://en.wikipedia.org/wiki/Transposition_cipher, accessed May 8, 2007, 8 pages.
Office Action for U.S. Appl. No. 11/807,261 mailed Jul. 19, 2010.
Office Action for U.S. Appl. No. 11/897,414 mailed Sep. 2, 2010.
Office Action for U.S. Appl. No. 12/072,069 mailed Sep. 2, 2010.
Office Action for U.S. Appl. No. 12/074,012 mailed Sep. 3, 2010.
Office Action for U.S. Appl. No. 12/325,228 mailed Sep. 3, 2010.
U.S. Appl. No. 11/807,261, Notice of Allowance dated Dec. 14, 2010.
U.S. Appl. No. 11,897,414, Final Office Action dated Dec. 28, 2010.
U.S. Appl. No. 12/072,069, Final Office Action dated Jan. 5, 2011.
U.S. Appl. No. 12/074,012, Notice of Allowance dated Jan. 11, 2011.
U.S. Appl. No. 12/325,228, Final Office Action dated Feb. 4, 2011.
U.S. Appl. No. 12/154,465, Office Action dated Sep. 20, 2010.
U.S. Appl. No. 12/154,465, Final Office Action dated Jan. 7, 2011.
Schneier, "Applied Cryptography" 1996, John Wiley and Sons, $2^{nd}$ Edition, p. 237.
Office Action for U.S. Appl. No. 11/807,261 Mailed Feb. 28, 2011.
Notice of Allowance for U.S. Appl. No. 11/807,261 Mailed Mar. 14, 2011.
Non-Final Office Action for U.S. Appl. No. 12/072,069, mailed Oct. 3, 2011.
Final Office Action for U.S. Appl. No. 12/325,228, mailed Oct. 14, 2011.
Office Action for U.S. Appl. No. 12/072,069, mailed Apr. 19, 2011.
Non-Final Office Action for U.S. Appl. No. 12/154,465, mailed Aug. 19, 2011.
McLauchlin, Apr. 6, 2007, "Random Number Generation for Cryptography," http://imps.mcmaster.ca/courses/SE-4C03-07/wiki/mclaucwj/Random_Number_Generation_for_Cryptography.html, pp. 103.
Red Hat Office Action for U.S. Appl. No. 11/897,414 Mailed Dec. 1, 2011.
Red Hat Office Action for U.S. Appl. No. 12/072,069, mailed Feb. 22, 2012.
Red Hat Notice of Allowance for U.S. Appl. No. 12/074,012 Mailed Jan. 11, 2011.
Red Hat Office Action for U.S. Appl. No. 12/125,833, mailed Dec. 9, 2011.
Red Hat Office Action for U.S. Appl. No. 12/125,833, mailed Mar. 16, 2012.
Red Hat Office Action for U.S. Appl. No. 12/154,465, mailed Dec. 28, 2011.
Red Hat Notice of Allowance for U.S. Appl. No. 11/897,414 mailed May 10, 2012.
Red Hat Office Action for U.S. Appl. No. 12/072,069, mailed Jun. 27, 2012.
Red Hat Office Action for U.S. Appl. No. 12/154,465, mailed May 4, 2012.
Entacher, Karl, "Appendix: Linear Recurrences", Jun. 16, 2012, 3 pages; from http://random.mat.sbg.ac.at/results/karl/server/node11.html.
Stein, "Visualizing Galois Fields", May 17, 2012, pp. 1-11 from http://nklein.com/2012/05/visualizing-galois-fields/.
Red Hat Notice of Allowance for U.S. Appl. No. 12/072,069, mailed Dec. 6, 2012.
Red Hat Notice of Allowance for U.S. Appl. No. 12/125,833, mailed May 24, 2013.
Red Hat Office Action for U.S. Appl. No. 12/325,228, mailed Apr. 12, 2012.
Red Hat Notice of Allowance for U.S. Appl. No. 12/325,228, mailed Sep. 14, 2012.
Red Hat Office Action for U.S. Appl. No. 12/154,465, mailed Sep. 19, 2012.
Red Hat Office Action for U.S. Appl. No. 12/154,465, mailed Dec. 17, 2012.
Red Hat Notice of Allowance for U.S. Appl. No. 12/154,465, mailed Jul. 11, 2013.

* cited by examiner

GENERATING PSEUDO RANDOM BITS FROM POLYNOMIALS

TECHNICAL FIELD

Embodiments of the present invention relate to generating cryptographic keys, and more specifically to generating pseudo random numbers.

BACKGROUND

In cryptography, pseudo random number generators are typically employed to generate some random numbers for creating a cryptographic key. A well-known pseudo random number generator that generates highly randomized numbers, which are strong in a cryptographic sense, is a Blum-Blum-Shub (BBS) pseudo random number generator. One conventional BBS pseudo random number generator uses two large prime integers, p and q, which are congruent to three, mod four. Their product, n=p*q, is called a Blum integer. An arbitrary integer, X, which is larger than both p and q, and relatively prime to n, is chosen. The BBS pseudo random number generator squares X, takes its remainder modulo n to produce a seed, $X_0$. Then the BBS pseudo random number generator iterates through multiple cycles to generate a predetermined number of pseudo random bits in each cycle. Note that a cycle may also be referred to as an iteration. To generate pseudo random bits, the BBS pseudo random number generator takes the most recent $X_i$ and squares it, then takes its remainder modulo n. The entire result is $X_{i+1}$, and the low order floor(lg(floor(lg(n)))) bits of $X_{i+1}$ are the output of one cycle of the BBS pseudo random number generator. The floor function returns the largest integer less than or equal to its argument, and the lg function is the logarithm of its argument in base 2. For example, if n is 21, which is the smallest Blum integer, the BBS pseudo random number generator may generate 2 bits every cycle.

The outputs of the BBS pseudo random number generator are pseudo random bits or pseudo random numbers because they are generated from the same set of initial values and they are not completely independent of each other. But nevertheless, the pseudo random numbers may approximate the behavior of true random numbers.

The security of the BBS pseudo random number generator rests on the size of n. In general, a larger n typically provides a more secure stream in a cryptographic sense. Note that increasing the number of bits generated at each cycle by 1 may require doubling the size of n. Furthermore, n also influences the period length of the output. One of the properties of n is that every quadratic residue modulo n has four square roots, one of which is also a quadratic residue. A quadratic residue is the residue of a perfect square. For example, 47 is a quadratic residue module 209. Thus, every X in the sequence of pseudo random number is a quadratic residue, and no more than ¼ of the values less than n can be quadratic residues. Thus, there are no more than n/4 distinct states for the BBS pseudo random number generator, so the maximum period is floor(n/4).

BRIEF DESCRIPTION OF THE DRAWINGS

The present invention is illustrated by way of example, and not by way of limitation, in the figures of the accompanying drawings and in which.

DETAILED DESCRIPTION

Described herein are some embodiments of a method and an apparatus to generate pseudo random bits from polynomials. In some embodiments, a set of finite field polynomials is used to generate a series of pseudo random bits in one or more cycles. Then a cryptographic key is generated from the series of pseudo random bits. A finite field generally refers to a field that contains only a finite number of elements. A finite field is also referred to as Galois Field (GF). The number of elements in a finite field is also referred to as an order of the finite field. In some embodiments, a polynomial having all of its coefficients from a finite field GF(p) is called a polynomial over the field GF(p). More details of some embodiments of the generation of the pseudo random bits from polynomials are described below.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a machine-readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required operations. The required structure for a variety of these systems will appear from the description below. In addition, the present invention is not described with reference to any particular programming language. It will be appreciated that a variety of programming languages may be used to implement the teachings of the invention as described herein.

Figure 1:
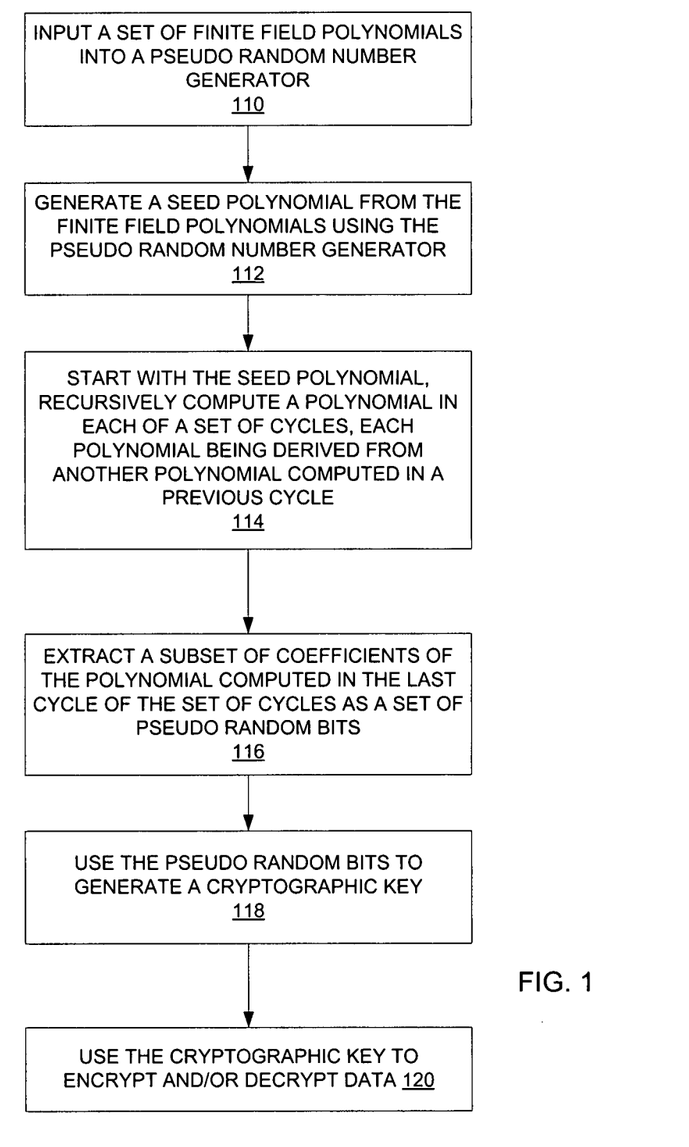
FIG. 1 illustrates a flow diagram of one embodiment of a process to generate pseudo random bits from finite field polynomials.

FIG. 1 illustrates a flow diagram of one embodiment of a process to generate random bits from finite field polynomials. The process may be performed by processing logic that may comprise hardware (e.g., circuitry, dedicated logic, programmable logic, microcode, etc.), software (such as instructions run on a processing device), firmware, or a combination thereof. For example, the pseudo random number generator 210 and the cryptographic key generator 220 in FIG. 2 may perform at least part of the process in some embodiments.

Referring to FIG. 1, processing logic inputs a set of finite field polynomials into a pseudo random number generator (processing block 110). For example, processing logic may input two primitive polynomials (p and q) of the same rank to a pseudo random number generator in one embodiment. A product of p and q is computed using polynomial multiplication over GF(2). Processing logic may further input a third polynomial to the pseudo random number generator. The third polynomial, X, may be a polynomial over GF(2) of a greater rank than either p or q, and mutually prime to n.

In some embodiments, processing logic generates a seed polynomial from the set of finite field polynomials (processing block 112). For example, processing logic may square the third polynomial X, and take its remainder modulo n, which results in the seed polynomial, $X_0$. Starting with the seed polynomial, $X_0$, processing logic recursively computes a polynomial in each of a number of cycles (a.k.a. iterations), where each polynomial in a current cycle is derived from another polynomial computed in a previous cycle (processing block 114). For example, processing logic may take the polynomial from the most recent cycle, $X_i$, and square it, then processing logic may take its remainder modulo n. The resulting polynomial is $X_{i+1}$. The coefficients of $X_{i+1}$ represent the series of pseudo random bits generated. In some embodiments, the number of cycles is dependent on the number of bits that are needed. Since only floor(lg(N−1)) bits per cycle may be used safely, where N is the order of the polynomial n (i.e., the number of bits in n), ceil(K/floor(lg(N−1))) cycles are needed, where ceil is the integer ceiling function, i.e., the smallest integer greater than or equal to its argument, and K is the number of bits required for the key. For example, with an N of 2048, 10 bits per cycle are generated. If K is 256, then 26 cycles are needed.

Next, processing logic extracts a subset of the coefficients of the polynomial computed in the last cycle as a series of pseudo random bits (processing block 116). In some embodiments, the low order floor(lg(floor(lg(n)))) bits of the coefficients of the polynomial computed in the last cycle are output as the series of pseudo random bits. Using the pseudo random bits, processing logic may generate a cryptographic key (processing block 118). Finally, processing logic uses the cryptographic key generated to encrypt and/or decrypt data (e.g., electronic documents, electronic mail, etc.) (processing block 120). In some embodiments, processing logic may use the cryptographic key to sign electronic communication (e.g., electronic mail, instant messages, etc.).

Alternatively, processing logic may use the pseudo random bits in other cryptographic functions. For example, processing logic may use the pseudo random bits to pad (or to extend) a message to an appropriate length (e.g., 128 bits, 256 bits, etc.) such that the same short message may result in a different encryption every time. By padding the message with cryptographically random bits, attacks against some common message encryption schemes (e.g., RSA encryption) may be thwarted. In some embodiments, the pseudo random bits are used in nonces (which comes from N-onces, a single-use "N" parameter) that are used to prevent replay attacks. In another embodiment, the pseudo random bits are used in bit string embedding, where a shorter bit string is made longer in such a way that the shorter bit string does not occur in the longer bit string, but is deterministically recoverable. Other uses of the pseudo random bits may include challenge strings for challenge-response protocols, and initialization vectors for block ciphers in cipher block chaining mode. One should appreciate that the applications discussed above are merely some exemplary applications of the pseudo random bits. The pseudo random bits may be applied to other cryptographic functions.

Unlike conventional Blum-Blum-Shub (BBS) pseudo random number generator, the above approach uses finite field polynomials instead of integers to generate pseudo random bits. Since many computing machines generally perform multiplication and division of finite field polynomials over GF(2) faster than the same operations over integers of comparable size, for suitably large polynomials and integers, the above approach is faster than the conventional BBS pseudo random number generator. For example, one embodiment of the pseudo random number generators, which is implemented using a Java script embedded within a web page, takes about 3 to 4 seconds to generate a set of pseudo random bits. In contrast, one conventional BBS pseudo random number generator operating on integers may take ten times to fifteen times longer to generate a comparable set of pseudo random bits.

Figure 2:
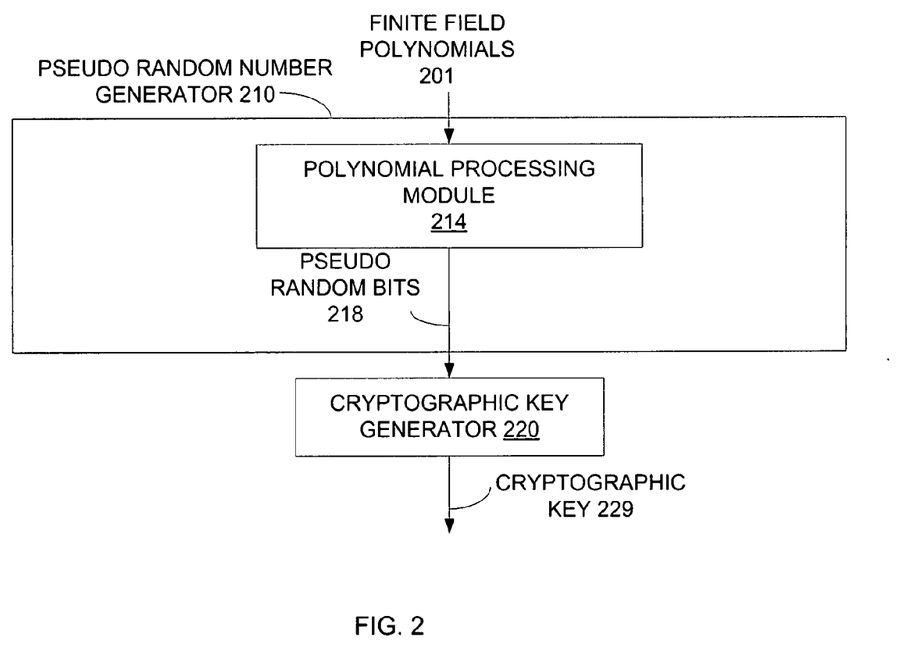
FIG. 2 illustrates a functional block diagram of one embodiment of a pseudo random number generator and a cryptographic key generator.

FIG. 2 illustrates a functional block diagram of one embodiment of a pseudo random number generator and a cryptographic key generator. The pseudo random number generator 210 and the cryptographic key generator 220 may be implemented on a general-purpose computer system, such as the one shown in FIG. 4. The pseudo random number generator 210 includes a polynomial processing module 214. In some embodiments, the polynomial processing module 214 is implemented using an application specific integrated circuit (ASIC). Alternatively, the polynomial processing module 214 may be implemented with software (e.g., a script) executable on the general-purpose computer system. Pseudo random bits 218 output by the pseudo random number generator 210 are input to the cryptographic key generator 220, which uses the pseudo random bits 218 from the pseudo random number generator 210 to generate a cryptographic key 229.

In some embodiments, a set of finite field polynomials 201 is input to the pseudo random number generator 210. The finite field polynomials 201 may include two primitive polynomials 201 of the same rank, p and q. The polynomial processing module 214 computes a product of p and q, i.e., n=p*q. The set of finite field polynomials 201 may further include a polynomial over GF(2), X, which is of a greater rank than p and q, and is mutually prime to n. The polynomial processing module 214 squares X and takes its remainder modulo n to generate a seed polynomial, $X_0$. Starting with the seed polynomial $X_0$, the polynomial processing module 214 may iterate through multiple cycles to generate a polynomial in each cycle from another polynomial in a previous cycle. For example, the polynomial processing module 214 may take the polynomial, $X_i$, from the most recent cycle and square it. Then the polynomial processing module 214 may take its remainder modulo n. The entire result is $X_{i+1}$. The coefficients of the $X_{i+1}$ represent a series of pseudo random bits 218, which may be provided to the cryptographic key generator 220. The cryptographic key generator 220 may extract the low order bits (e.g., the three lowest order bits) from the series of pseudo random bits 218 and use the extracted bits to generate the cryptographic key 229.

Figure 3A:
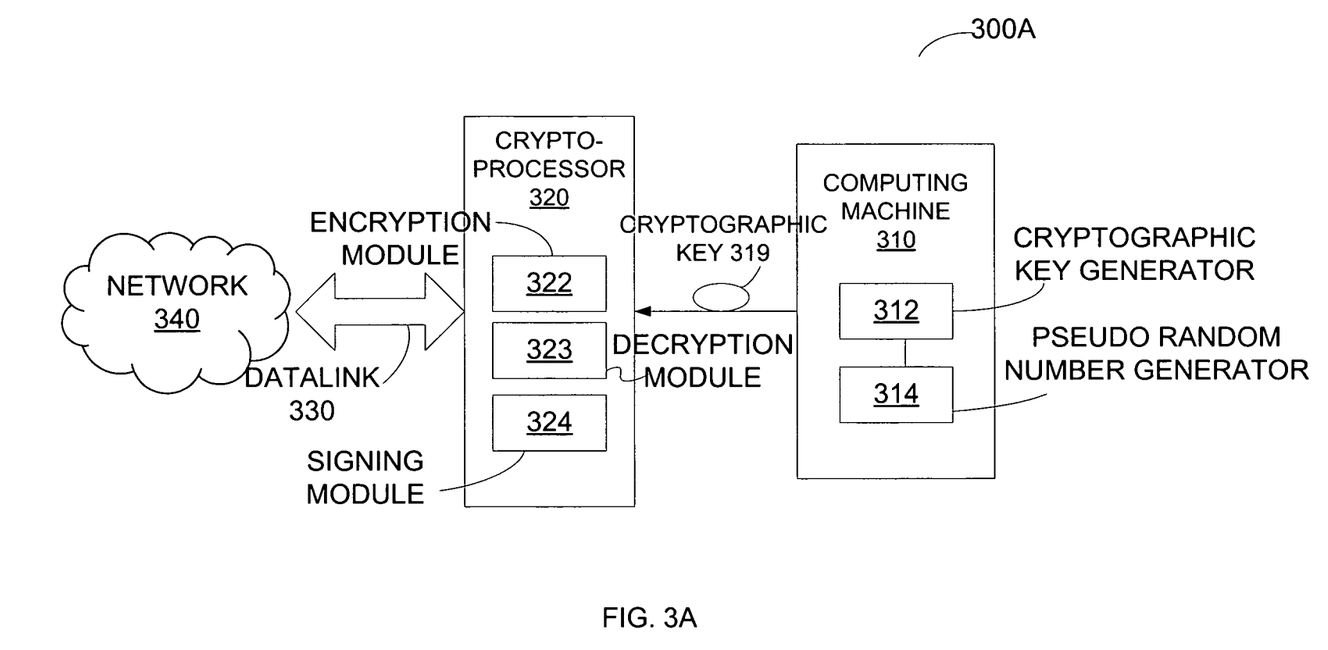
FIG. 3A illustrates one embodiment of a system in which embodiments of the present invention may be implemented.

FIG. 3A illustrates one embodiment of a system in which embodiments of the present invention may be implemented. The system 300A includes a computing machine 310, a crypto-processor 320, a datalink 330, and a network 340. The computing machine 310 is coupled to the crypto-processor 320, which is further coupled to the datalink 330. The datalink 330 is coupled to the network 340. Some examples of the computing machine 310 may include a server, a desktop personal computer (PC), a laptop PC, a personal digital assistant (PDA), a mobile telephone, etc. The crypto-processor 320 may be implemented on a special-purpose integrated circuit (IC) chip external to the computing machine 310, and hence, the crypto-processor 320 may also be referred to as a cryptographic-chip. Alternatively, the crypto-processor 320 may be implemented with a general-purpose processing device and/or software. The datalink 330 includes a communication medium or channel for transmitting data between the crypto-processor 320 and the network 340. The network 340 may include various types of networks, such as local area network (LAN), wide area network (WAN), wireless network, wirelined network, etc.

Note that any or all of the components and the associated hardware illustrated in FIG. 3A may be used in various embodiments. However, it should be appreciated that other configurations of the system 300A may include one or more additional devices not shown in FIG. 3A.

In some embodiments, the computing machine 310 includes a cryptographic key generator 312 and a pseudo random number generator 314. The pseudo random number generator 314 may be implemented by hardware, software, or a combination of both. For example, the pseudo random number generator 314 may be implemented using a Java script embedded within a web page. Alternatively, customized hardware (e.g., ASIC, Field Programmable Logic Array (FPLA), etc.) may be used to implement the pseudo random number generator 314. Details of some embodiments of the pseudo random number generator 314 have been described above. The pseudo random number generator 314 generates a set of pseudo random bits, which are input to the cryptographic key generator 312. The cryptographic key generator 312 generates a cryptographic key 319 using the pseudo random bits. Details of some embodiments of the process to generate the cryptographic key 319 using the pseudo random bits have been described above. The computing machine 310 then sends the cryptographic key 319 to the crypto-processor 320.

In some embodiments, the crypto-processor 320 includes an encryption module 322, a decryption module 323, and a signing module 324. Using the cryptographic key 319 from the computing machine 310, the encryption module 322 may encrypt data (e.g., electronic documents, electronic mail, messages, etc.) from the computing machine 310 before sending the data onto the datalink 330. Likewise, the decryption module 323 may decrypt data from the datalink 330 before sending the data to the computing machine 310. In some embodiments, the signing module 324 uses the cryptographic key 319 to sign communication (e.g., electronic mail, electronic files, etc.) from the computing machine 310. Once signed, the communication may be sent to the network 340 via the datalink 330.

Figure 3B:
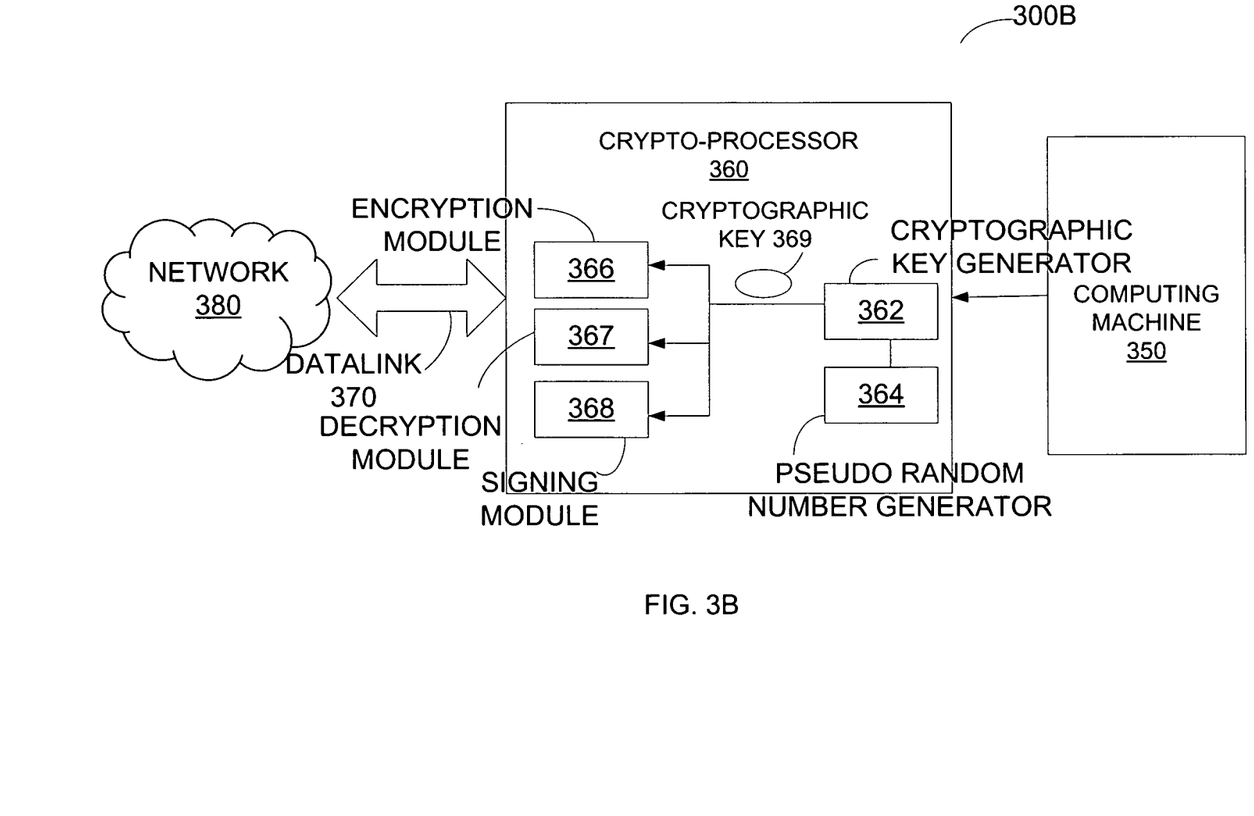
FIG. 3B illustrates an alternate embodiment of a system in which embodiments of the present invention may be implemented.

FIG. 3B illustrates an alternate embodiment of a system in which embodiments of the present invention may be implemented. The system 300B includes a computing machine 350, a crypto-processor 360, a datalink 370, and a network 380. The computing machine 350 is coupled to the crypto-processor 360, which is further coupled to the datalink 370. The datalink 370 is coupled to the network 380. Some examples of the computing machine 350 may include a server, a desktop PC, a laptop PC, a PDA, a mobile telephone, etc. The crypto-processor 360 may be implemented on an ASIC external to the computing machine 350, and hence, the crypto-processor 360 may also be referred to as a cryptographic-chip. Alternatively, the crypto-processor 360 may be implemented on a general-purpose computing device. The datalink 370 includes a communication medium or channel for transmitting data between the crypto-processor 360 and the network 380. The network 380 may include various types of networks, such as LAN, WAN, wireless network, wirelined network, etc.

Note that any or all of the components and the associated hardware illustrated in FIG. 3B may be used in various embodiments. However, it should be appreciated that other configurations of the system 300B may include one or more additional devices not shown in FIG. 3B.

In some embodiments, the crypto-processor 360 includes a cryptographic key generator 362, a pseudo random number generator 364, an encryption module 366, a decryption module 367, and a signing module 368. The pseudo random number generator 364 may be implemented by hardware, software, or a combination of both. For example, the pseudo random number generator 364 may be implemented using a Java script embedded within a web page. Alternatively, customized hardware (e.g., FPLA, ASIC, etc.) may be used to implement the pseudo random number generator 364. Details of some embodiments of the pseudo random number generator 364 have been described above. The pseudo random number generator 364 generates a set of pseudo random bits, which are input to the cryptographic key generator 362. The cryptographic key generator 362 generates a cryptographic key 369 using the pseudo random bits. Details of some embodiments of the process to generate the cryptographic key 369 using the pseudo random bits have been described above. The cryptographic key generator 362 then sends the cryptographic key 369 to the encryption module 366, the decryption module 367, and/or the signing module 368.

Using the cryptographic key 369, the encryption module 366 may encrypt data (e.g., electronic documents, electronic mail, messages, etc.) from the computing machine 350 before sending the data onto the datalink 370. Likewise, the decryption module 367 may decrypt data from the datalink 370 before sending the data to the computing machine 350. In some embodiments, the signing module 368 uses the cryptographic key 369 to sign communication (e.g., electronic mail, electronic files, etc.) from the computing machine 350. Once signed, the communication may be sent to the network 380 via the datalink 370.

Figure 4:
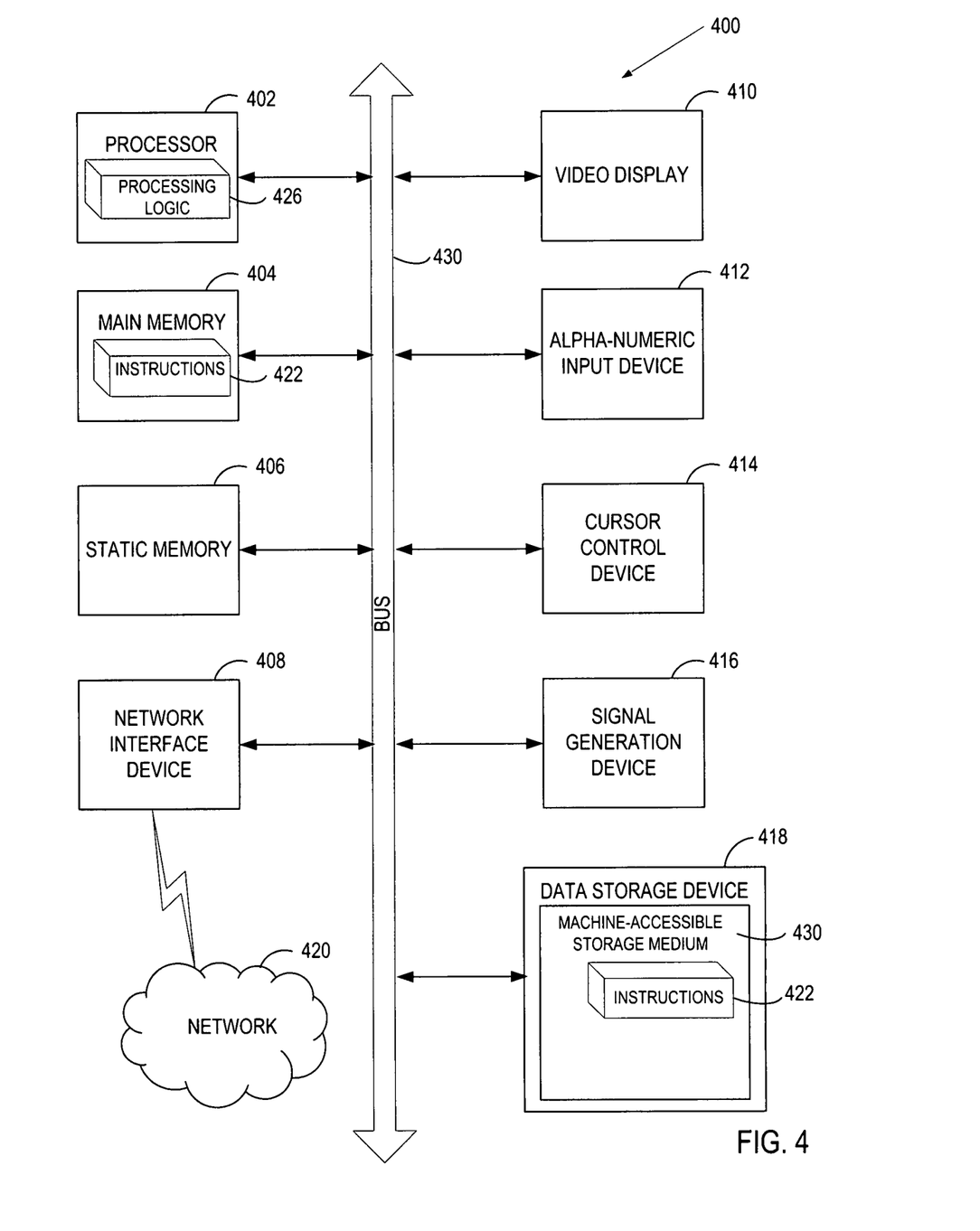
FIG. 4 illustrates a block diagram of an exemplary computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 430 (also known as a machine-readable storage medium) on which is stored one or more sets of instructions (e.g., software 422) embodying any one or more of the methodologies or functions described herein. The software 422 may also reside, completely or at least partially, within the main memory 404 and/or within the processing device 402 during execution thereof by the computer system 400, the main memory 404 and the processing device 402 also constituting machine-accessible storage media. The software 422 may further be transmitted or received over a network 420 via the network interface device 408.

While the machine-accessible storage medium 430 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, etc.

Thus, some embodiments of a method and an apparatus to generate pseudo random bits from polynomials have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:

generating, by a processing device, in a first cycle, a first set of pseudo random bits from a plurality of polynomials defined over a finite field by obtaining a product of a first polynomial and a second polynomial from the plurality of polynomials and obtaining a remainder of a third polynomial from the plurality of polynomials, modulo the product of the first polynomial and the second polynomial;

generating, by the processing device, in additional cycles following the first cycle, additional pseudo random bits based on the first set of pseudo random bits, wherein each additional cycle generates a first number of bits, wherein each additional cycle uses a second number of bits of the first number of bits generated in a previous cycle, and wherein the second number is less than the first number; and performing, by the processing device, a cryptographic function using the first set of pseudo random bits and the additional pseudo random bits.

2. The method of claim 1, wherein the first polynomial and the second polynomial are primitive polynomials, and wherein the first polynomial has a first rank equal to a second rank of the second polynomial, and wherein the third polynomial has a third rank greater than the first rank and greater than the second rank.

3. The method of claim 1, wherein the first polynomial and second polynomial are primitive polynomials over GF(2), and wherein the third polynomial is over GF(2) and is mutually prime to the product of the first polynomial and the second polynomial.

4. The method of claim 1, wherein performing the cryptographic function comprises:

generating a cryptographic key using the first set of pseudo random bits and the additional pseudo random bits;

encrypting a first electronic document before sending the first electronic document to a network using the cryptographic key; and decrypting a second electronic document from the network before forwarding the second electronic document to a computing machine using the cryptographic key.

5. The method of claim 1, wherein performing the cryptographic function comprises:

generating a cryptographic key using the first set of pseudo random bits and the additional pseudo random bits; and signing an electronic communication using the cryptographic key.

6. The method of claim 1, wherein performing the cryptographic function comprises at least one of:

forming an encryption key, adding random padding to a message, generating a random parameter for a cryptographic protocol, generating a challenge parameter for a challenge-response protocol, generating an initialization vector, or embedding a first bit string in a second bit string, wherein the second bit string is longer than the first bit string, and wherein the second bit string is indistinguishable from a random bit string of the same length.

7. An apparatus comprising:

a memory to store a plurality of polynomials defined over a finite field; and a processing device, coupled to the memory, the processing device to:

generate, in a first cycle, a first set of pseudo random bits from the plurality of polynomials by obtaining a product of a first polynomial and a second polynomial from the plurality of polynomials and obtaining a remainder of a third polynomial from the plurality of polynomials, modulo the product of the first polynomial and the second polynomial;

generate, in additional cycles following the first cycle, additional pseudo random bits based on the first set of pseudo random bits, wherein each additional cycle generates a first number of bits, wherein each additional cycle uses a second number of bits of the first number of bits generated in a previous cycle, and wherein the second number is less than the first number; and perform a cryptographic function using the first set of pseudo random bits and the additional pseudo random bits.

8. The apparatus of claim 7, wherein the first polynomial and the second polynomial are primitive polynomials, and wherein the first polynomial has a first rank equal to a second rank of the second polynomial, and wherein the third polynomial has a third rank greater than the first rank and greater than the second rank.

9. The apparatus of claim 7, wherein the first polynomial and the second polynomial are primitive polynomials over GF(2), and wherein the third polynomial is over GF(2) and is mutually prime to the product of the first polynomial and the second polynomial.

10. The apparatus of claim 7, wherein the processing device is to perform the cryptographic function by:

generating a cryptographic key using the first set of pseudo random bits and the additional pseudo random bits;

encrypting data using the cryptographic key; and decrypting data using the cryptographic key.

11. The apparatus of claim 7, wherein the processing device is to perform the cryptographic function by:

generating a cryptographic key using the first set of pseudo random bits and the additional pseudo random bits; and signing an electronic communication using the cryptographic key.

12. A system comprising the apparatus of claim 7, further comprising:

a datalink; and a cryptographic-chip coupled between the datalink and the apparatus, wherein the cryptographic-chip comprises an encryption module to use a cryptographic key generated by the apparatus to encrypt data from the apparatus before sending the data onto the datalink.

13. A system comprising the apparatus of claim 7, further comprising:

a datalink; and a cryptographic-chip coupled between the datalink and the apparatus, wherein the cryptographic-chip comprises a decryption module to use a cryptographic key generated by the apparatus to decrypt data from the datalink before sending the data to the apparatus.

14. The apparatus of claim 7, wherein the processing device is to perform the cryptographic function by at least one of:

forming an encryption key, adding random padding to a message, generating a random parameter for a cryptographic protocol, generating a challenge parameter for a challenge-response protocol, generating an initialization vector, or embedding a first bit string in a second bit string, wherein the second bit string is longer than the first bit string, and wherein the second bit string is indistinguishable from a random bit string of the same length.

15. A non-transitory machine-readable medium comprising instructions that, when executed by a processing device, cause the processing device to perform operations comprising:

generating, by the processing device, in a first cycle, a first set of pseudo random bits from a plurality of polynomials defined over a finite field by obtaining a product of a first polynomial and a second polynomial from the plurality of polynomials and obtaining a remainder of a third polynomial from the plurality of polynomials, modulo the product of the first polynomial and the second polynomial;

generating, by the processing device, in additional cycles following the first cycle, additional pseudo random bits based on the first set of pseudo random bits, wherein each additional cycle generates a first number of bits, wherein each additional cycle uses a second number of bits of the first number of bits generated in a previous cycle, and wherein the second number is less than the first number; and performing, by the processing device, a cryptographic function using the first set of pseudo random bits and the additional pseudo random bits.

16. The non-transitory machine-readable medium of claim 15, wherein the first polynomial and the second polynomial are primitive polynomials, and wherein the first polynomial has a first rank equal to a second rank of the second polynomial, and wherein the third polynomial has a third rank greater than the first rank and greater than the second rank.

17. The non-transitory machine-readable medium of claim 15, wherein the first polynomial and the second polynomial are primitive polynomials over GF(2), and wherein the third polynomial is over GF(2) and is mutually prime to the product of the first polynomial and the second polynomial.

18. The non-transitory machine-readable medium of claim 15, wherein performing the cryptographic function comprises:

generating a cryptographic key using the first set of pseudo random bits and the additional pseudo random bits; and signing an electronic communication using the cryptographic key.

19. The non-transitory machine-readable medium of claim 15, wherein performing the cryptographic function comprises at least one of:
- forming an encryption key,
- adding random padding to a message,
- generating a random parameter for a cryptographic protocol,
- generating a challenge parameter for a challenge-response protocol,
- generating an initialization vector, or
- embedding a first bit string in a second bit string, wherein the second bit string is longer than the first bit string, and wherein the second bit string is indistinguishable from a random bit string of the same length.

* * * * *